United States Patent
Corzine

[15] 3,658,612
[45] Apr. 25, 1972

[54] METHOD OF FABRICATING CELLULAR FOAM CORE STRUCTURE ASSEMBLY

[72] Inventor: Luke H. Corzine, Lakewood, Calif.
[73] Assignee: Unicor Inc., Paramount, Calif.
[22] Filed: Oct. 24, 1969
[21] Appl. No.: 869,073

Related U.S. Application Data

[60] Division of Ser. No. 819,796, Apr. 28, 1969, which is a continuation-in-part of Ser. No. 383,390, July 17, 1964, abandoned.

[52] U.S. Cl. ................................156/93, 161/135, 161/36
[51] Int. Cl. ........................................................B32b 7/08
[58] Field of Search ...............161/36, 135, 309; 156/93, 91; 52/309

[56] References Cited

UNITED STATES PATENTS

| | | | |
|---|---|---|---|
| 2,692,219 | 10/1954 | Slayter et al. | 156/93 X |
| 2,737,227 | 3/1956 | Brummel | 156/93 X |
| 2,788,053 | 4/1957 | Dolbey et al. | 156/93 X |
| 2,948,950 | 8/1960 | Finger et al. | 161/135 X |
| 3,117,902 | 1/1964 | Holzheimer | 161/36 X |
| 3,145,131 | 8/1964 | Finke | 161/36 |
| 3,188,813 | 6/1965 | Foster et al. | 161/135 |
| 3,192,099 | 6/1965 | Beckman et al. | 161/135 X |
| 3,339,326 | 9/1967 | Derr et al. | 52/309 |

Primary Examiner—Benjamin A. Borchelt
Assistant Examiner—Daniel Bent
Attorney—Mahoney, Hornbaker & Schick

[57] ABSTRACT

A series of preformed, elongated foam cores are positioned generally longitudinally parallel and transversely aligned and are covered with primary base and covering layers of a relatively flexible fabric, such as fiber glass. In the assembly, the primary base layer extends continuously along common lower base sides of the foam cores, while the primary covering layer extends continuously upwardly over and downwardly transversely between the foam cores, the primary layers being stitched at the transverse extremities of each of the foam cores. Depending on the transverse cross sectional configurations of the foam cores, the stitched primary layer and core assemblies may be used separately or with one inverted and assembled interfitting with another, and may be shaped in various configurations and sandwiched between continuous secondary covering layers of fabric, in all cases all of the fabric layers and stitching being completely covered and impregnated with resin cured to rigidify the overall assembly. Still further, such assemblies may be incorporated with the rigid, thickened face layer of various materials and configurations at one or both sides thereof, for instance, a thickened face layer of cured resin.

10 Claims, 14 Drawing Figures

Patented April 25, 1972

INVENTOR
LUKE H. CORZINE

Patented April 25, 1972 3,658,612

INVENTOR
LUKE H. CORZINE

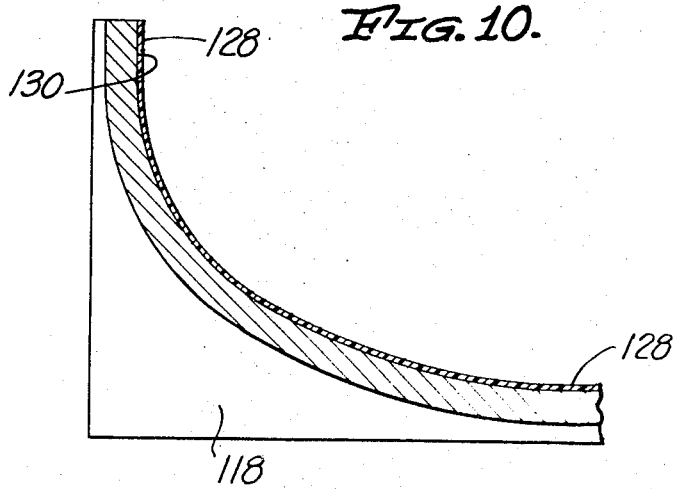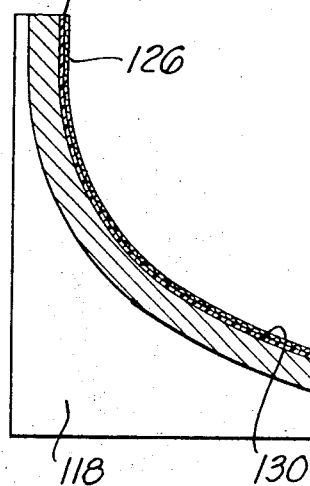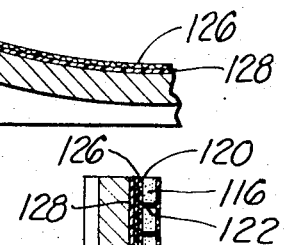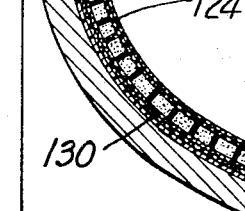

METHOD OF FABRICATING CELLULAR FOAM CORE STRUCTURE ASSEMBLY

CROSS-REFERENCE TO RELATED APPLICATIONS

This application is a division of my co-pending application Ser. No. 819,796, filed Apr. 28, 1969, entitled, "Cellular Foam Core Structure Assembly and Method of Fabrication," which co-pending application is, in turn, a continuation-in-part of my now abandoned application Ser. No. 383,390, filed July 17, 1964, entitled, "Structural Member and Method of Fabricating."

BACKGROUND OF THE INVENTION

This invention relates to methods of fabricating cellular foam core structure assemblies, and more particularly to such methods which are adaptable in a relatively simple manner to an extremely wide variety of uses. For instance, using the same basic procedures and with a proper selection of foam core configuration, the basic cellular foam core structure assembly may be integrated into wood, composition or metal based panel structures having a wide variety of plane or curved shapes, and is equally adaptable to various plastic constructions. Furthermore, the basic cellular foam core structure assembly includes a series of preformed foam cores of a closed cell plastic foam material which are covered in a particular assembled position by specifically shaped primary base and covering layers of a flexible fabric material and the fabric material layers stitched between foam cores for retaining such assembly. In final overall assembly, as selectively integrated with various face coatings and secondary covering fabric layers, the basic assembly has all of the fabric layers and stitching covered and impregnated with a resin which is cured after said covering and impregnation to provide a final basic assembly having relatively high structural strength in the overall assembly despite the simplicity of construction and the wide versatility of use.

Many forms of composite cellular foam and resin rigidified fabric structures have heretofore been provided, all of which have serious inherent limitations and most of which may only be applied to particular customized uses. One of the more prevalent of these prior constructions is the honeycomb core structure or similar, slightly changed adaptations thereof. In the honeycomb core or similar structures, the basic core consists of a mass of adjacent compartments formed by edge positioned fabric strips covered, sometimes impregnated, and rigidified by a cured resin, the thusly formed compartments later being filled by a cellular foam to complete the basic core assembly and then covered by sheets of resin rigidified fabrics and other structural materials for the overall assembly.

In the specific procedures of forming these prior honeycomb and similar basic core structures, the most common method is to first form the fabric strips while the fabric is in a flexible condition into the honeycomb or other adjacent compartment configurations, while at the same time, conforming this then flexible fabric into the desired shape of the final overall assembly. The fabric strips are then resin coated, sometimes resin impregnated, and cured to place the specifically configured fabric strips in a rigidified and form retaining condition. The final basic core structure is then completed by foam filling the rigidly retained compartments with a cellular foam which is normally chemically cured during and immediately following such installation.

Under certain relatively limited conditions, it has been possible to originally form the edge positioned fabric strips into the honeycomb and similarly shaped compartment form and cured resin rigidify the same while the fabric edges are resting on a plane surface resulting in a compartmentalized shell defining such plane surface. In this case, the resin rigidified shell may be formed into limited curved configurations wherein the compartment openings and the rigidified fabric edges define somewhat curved surfaces as desired in the final overall assembly. The extent to which this originally rigidified flat shell may be shaped into the curved surface defining formation is, of course, determined by the inherent combined flexibility of the fabric and cured resin, but in any event, it is only after this curved surface formation that the final foam filling may take place in order to complete the basic assembly.

Thus, despite the particular procedure followed in the fabrication and formation of these prior honeycomb and similarly shaped basic core structures, the designed use thereof is always further limited and restricted to an overall final structure that permits installation of the foam into the compartments of the core shell during the final overall assembly. This requirement alone greatly restricts the designs to which such prior core structures may be adapted. Also, except as permitted by the extremely small range of flexibility of the cured resin rigidified fabric in the latter fabrication procedure, these prior core structures always require the formation of a specific custom structure usable only in an exactly predetermined final overall structure so that modular basic core structure formation is virtually eliminated.

OBJECTS AND SUMMARY OF THE INVENTION

It is, therefore, an object of this invention to provide methods of fabricating cellular foam core structure assemblies wherein the basic cellular foam core structure, later integrated into the final overall assembly, is adaptable to both customized fabrication and use where particular conditions dictate, and for widely versatile modular fabrication and use under many other conditions. With the basic cellular foam structure of the present invention, whether in customized or modular form, there are no limitations placed on the final overall assembly by the requirement of accessibility to install the cellular foam, since the cellular foam is originally placed in the basic structure in virtually its final form prior to any attempt to integrate the basic structure into the final overall assembly. Furthermore, there are no limitations as to fabric flexibility in a resin rigidified form, nor any further limitations on fabric weave or original formation, the fabric always remaining in its original flexible form until integration into and the final fabrication of the overall assembly, despite the fact that the basic core structure is of a self integrated form at the time of inclusion into the final overall assembly.

It is a further object of this invention to provide methods of fabricating cellular foam core structure assemblies having all of the foregoing advantageous attributes, yet the basic core structure is of an extremely simple and easily fabricated form, and is integrated into the final overall assembly with maximum ease and convenience. In general terms, the basic core structure consists of a series of preformed, elongated, cellular foam cores positioned generally parallel in longitudinal extension and generally transversely aligned, said cores being of defined transverse cross sections depending on the intended final structure use, whether of customized form or versatile modular form. A primary base layer of fabric underlies the thusly positioned foam cores and a primary covering layer of fabric extends continuously upwardly over each of the cores to and from the primary base layer, the primary base and covering layers being stitched together at the transverse extremities of each of the cores completing a self-contained assembly wherein the fabric is still in its originally woven flexible form.

At this stage, the basic core structure is ready for integration into the overall assembly and with the fabric still in its original flexible form, the basic core structure may be freely shaped to conform to the desired final overall assembly with only a modified limitation in such shaping by virtue of the preformed foam cores. In this respect, however, the transverse cross sectional shapes of the preformed foam cores, which may be uniform throughout or different at various locations, will to a great extent determine the overall flexibility and the type of final assembly shaping to which the basic core structure may be subjected transversely of the foam cores, and the inherent cellular foam composition of the foam cores will permit a limited amount of flexing longitudinally thereof without destructive fracture and while still maintaining structural integrity. The basic core structure may be flexibly shaped and formed into the final overall assembly as a single unit, or with particular foam core cross sectional shapes and positioning, with a similar basic core structure in a sandwich assembly as a unit, in either case the flexible fabric of the basic core structure being coated and impregnated with a wet resin which is later rigidified by curing to rigidify and resin bond the final overall assembly. In addition, the final overall assembly may include resin rigidified secondary covering layers of fabric and thickened face coats or layers of various materials, all integrated with the basic core structure or structures preferably through cured resin bonding.

It is evidence, therefore, that the method of fabricating cellular foam core structure assemblies of the present invention involves basic concepts completely the reverse of the prior composite foam and resin rigidified fabric constructions hereinbefore discussed, such as the honeycomb and similarly shaped basic core structures. In the prior structures, the originally flexible fabric is formed into final shape, cured resin rigidified and then made use of to support the later installed cellular foam, such required procedure creating serious limitations in use of such structures and requiring each to be of customized form. According to the principles of the present invention, however, the cellular foam is originally preformed into determined cross section cores of configurations which will not greatly inhibit but rather actually complement the flexibility of the basic core structures, and these preformed foam cores are used to support the flexible fabric during the integration of the basic core structure into the final overall assembly with the same only being required to be cured resin rigidified in the final stages of integration into the overall assembly so as to permit adaptation to a wide variety of final shapes.

Other objects and advantages of the invention will be apparent from the following specification and the accompanying drawings which are for the purpose of illustration only.

BRIEF DESCRIPTION OF THE DRAWINGS

FIGS. 10, 11, 12 and 13 are fragmentary, vertical sectional views illustrating the fabrication steps in the mold lay-up of the final overall assembly of FIG. 9.

DESCRIPTION OF THE BEST EMBODIMENTS CONTEMPLATED

Figure 1:
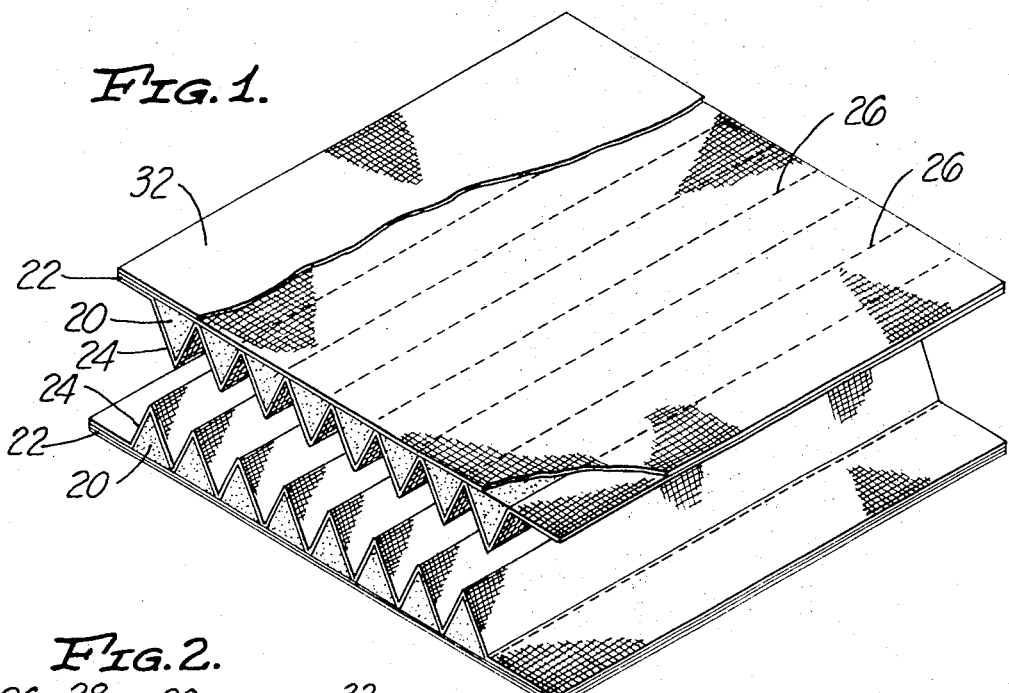
FIG. 1 is a perspective view, with parts broken away, illustrating two, substantially identical, basic cellular foam core structures, each in subassembly with a secondary covering fabric layer, ready for further assembly into a sandwich construction, all according to certain of the principles of the present invention.

As hereinbefore pointed out, the methods of the present invention involve the fabrication of basic cellular foam core structures which are relatively simple in structural form, yet having extremely wide versatility and adapted for integration into a great variety of overall final assemblies. It is the intent in the drawings of the present application and in the following description and discussion to illustrate and specifically describe the basic cellular foam core structure elements, the fabrication of various basic cellular foam core structures having presently conceived uses, and certain final overall assemblies with the procedural steps for fabricating the same integrating various of the basic cellular foam core structures therein, all constituting parts of the present invention. It is not intended, however, by such illustrations, descriptions and discussions to limit the broader principles of the present invention to these particular embodiments, and it is envisioned that many future uses will be conceived, all within the scope of the present invention.

Figure 2:
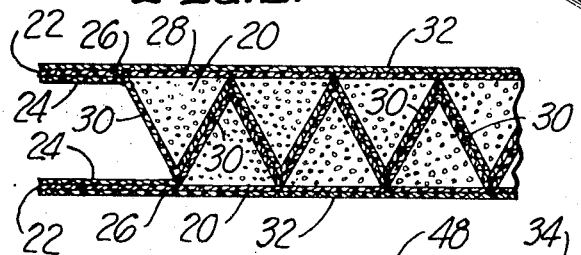
FIG. 2 is an enlarged, fragmentary, vertical sectional view taken transversely of the foam cores and illustrating the foam core structure subassemblies of FIG. 1 in their final sandwich construction including cured resin rigidifying and resin bonding.

Referring to FIGS. 1 and 2 of the drawings, an embodiment of basic cellular foam core structure is shown adapted for integration into a sandwich assembly and having certain uses in singular form. The sandwich construction is illustrated and makes use of two of the basic cellular foam core structures, one inverted and inter-engaged downwardly fully with the other. As is broadly true of all of the basic cellular foam core structures of the present invention, the basic structure herein involved includes a series of preformed, elongated, cellular foam cores generally indicated at 20, a primary base layer of fabric 22, a primary covering layer of fabric 24 and a series of specifically located lines of stitching 26.

Each of the cellular foam cores 20 is preformed prior to even assembly into the basic cellular foam core structure from a closed cell plastic foam material such as polyurethane and similar plastic foam materials so that each of the foam cores is of a shape self-sustaining construction at the time of assembly into the basic core structure. In the formation of the basic core structure, a series of the foam cores 20 are positioned substantially parallel in their longitudinal extension, substantially transversely aligned and in this case transversely adjacent. Furthermore, each of the foam cores 20 is of the same isosceles triangular shape in transverse cross section so as to have in transverse cross section substantially flat sides consisting of a lower base side 28 and generally oppositely transversely facing sides 30 joined at the core upper extremity.

Continuing with the assembly of the basic core structure, the primary base layer of fabric 22 is positioned extending continuously longitudinally and transversely along and between all of the foam core lower base sides 28 while being maintained substantially free of upward projection between the foam cores 20. The primary base layer of fabric 22, as is true of all other fabric layers used in the basic core structure and in most cases throughout cellular foam core structure assemblies, may be a single or multiple ply layer of virtually any weave and of virtually any usual flexible fabric material, such as animal, vegetable and synthetic fibers with fiberglass fibers being preferred for their strength and nondeteriorating qualities in a large number of instances, the choice of weave and fabric material being dependent on the desired characteristics of the finished product. Also, in the basic core structure, and until ready for integration into an overall or final cellular foam core structure subassembly or assembly, the fabric making up the primary base layer 22 remains in its flexible state.

The primary covering layer of fabric 24 of similar flexible fabric is positioned extending continuously longitudinally and transversely over and between the foam core oppositely transversely facing sides 30 so as to cover all of the foam cores 20 upwardly over the upper extremities and contact the primary base layer 22 transversely between the foam cores. The primary covering layer 24 again remains in its flexible state and the basic core structure is completed by stitching transversely between each of the foam cores 20 to secure the primary base and covering layers 22 and 24 together forming the lines of stitching 26, the stitching thread being any of the usual materials and preferably the same as that making up the fabric of the primary base and covering layers. Thus, in the completed basic core structure, the flexible primary base and covering layers 22 and 24 abut all of the flat sides 28 and 30 of all of the foam cores 20 so that the foam cores support these layers at this stage and will continue to do so during integration into the final subassemblies and assemblies, but at the same time, these stitched flexible fabric layers provide complete transverse flexibility of the structure within the limitations of the foam core transverse corss sections and reasonable longitudinal flexibility within the limitations of the foam core internal closed cell constructions.

Although the basic core structure as fabricated with the isosceles triangular configurations of the foam cores 20 has a variety of uses in both singular and multiple form depending on the particular final cellular foam core structure assembly into which it is integrated and the purpose of such final assembly, in the illustration of FIGS. 1 and 2, the basic core structures are integrated into a sandwich assembly wherein one is inverted and interengaged downwardly fully with another. In forming such assembly, the basic core structures have the primary base and covering layers 22 and 24 thereof thoroughly coated and impregnated with a curable wet resin which may be of usual forms such as polyester, epoxy and phenolic resins, and which may be catalyzed to produce rigidifying cures at room temperatures or elevated temperatures, again dependent on the particular characteristics desired, the particular uses and the particular final assemblies. Furthermore, in the particular final assembly of FIGS. 1 and 2, a secondary covering layer of fabric 32 is positioned in flexible state over and continuously covering the primary base layer 22 of each of the basic core structures and is covered and impregnated with the curable wet resin, it being noted that the secondary covering layers likewise do not project upwardly transversely between the foam cores 20, but rather remain only as covering layers.

Thereafter, the basic core structures with their assembled secondary covering layers 32 are brought into final sandwich interengaged assembly in the still flexible and wet state in the manner shown in FIG. 2. This final sandwich assembly is then retained in the final desired shape while the resin curing and rigidifying is carried out, the resin rigidifying causing rigidifying of the entire assembly and the resin bonding of abutting fabric layers in and between the basic core structures, including the stitching 26 and the fabric layers at these areas of the basic core structure. If the resin is catalyzed to produce curing at room temperature, the sandwich assembly is merely retained in the final desired shape for a curing period of time, and if the resin is catalyzed to produce curing at elevated temperatures, the sandwich assembly is raised to such elevated temperatures and retained for the curing time, thereby producing a finally rigidified overall assembly.

As shown in FIG. 2, the sandwich assembly has been shaped for final curing and rigidifying so as to produce a final flat panel, and with the identically sized and shaped foam cores 20, this will produce the maximum contact and resin bond between the parts of the primary covering layers 24 abutting transversely between the foam cores at the foam core facing sides 30 resulting in a virtually solid integrated final overall assembly. While in the fully interengaged sandwich assembly of FIG. 2 and with the basic core structures still in the resin wet stage, it is possible to form limited curved shapes in either or both of the transverse and longitudinal directions within the limits of the inherent flexibility of the closed cell compositions of the foam cores 20, but without actually fracturing or otherwise damaging the cellular structure of the foam cores. More sharp curved shaping, however, and particularly in the assembly transverse direction, would require less interengagement between the individual basic core structures although this would still in finally cured resin rigidified state produce a relatively strong final assembly, as long as some abutment is maintained between the parts of the primary covering layer at the foam core facing sides 30.

In other words, the versatility of even this sandwich form of assembly in various curved forming is relatively great and a wide choice is presented, depending on the ultimate strength, shaping and structural integrity required. Also, this final sandwich assembly, as well as other assemblies and individual basic core structures may be combined still further with various materials, either in the wet stage prior to resin curing and rigidifying or after such curing and rigidifying. Certain of these more complex assemblies using other basic core structures will be hereinafter described more in detail, but it should be kept in mind that the just-described sandwich assembly is equally adaptable.

Figure 3:
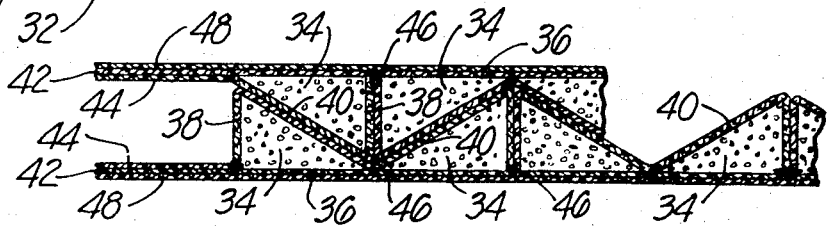
FIGS. 3, 4 and 5 are views similar to FIG. 2, but illustrating different forms of foam core structure subassemblies in various sandwich constructions.

A different final sandwich assembly using two basic core structures is shown in FIG. 3, wherein each of the basic core structures is again identical, but of slightly different configuration. As shown in FIG. 3, a series of elongated foam cores 34 are again positioned parallel in longitudinal extension and generally transversely aligned, the foam cores again being triangular in transverse cross section, but cross sectionally defining right triangles positioned in transversely adjacent sets. Each of the foam cores 54 has a lower base side 36 and may be generally described as having oppositely transversely facing sides, in this case, an upright side 38 and an angled side 40, all sides again being flat.

Still referring to the individual basic core structures, the sets of foam cores 34 are positioned with the upright sides 38 adjacent so that the angled sides 40 of a given set generally transversely face the angled sides of the adjacent foam core sets. A primary base layer of flexible fabric 42 is positioned extending along the foam core lower base sides 36 continuously longitudinally and transversely of the foam cores and between said cores, with a primary covering layer of flexible fabric 44 extending continuously upwardly over the foam core upright and angled sides 36 and 40 including along the upright sides downwardly between the foam cores 34 of each set. The basic core structures are completed ready for integration into a final sandwich assembly by securement of the primary base and covering layers 42 and 44 in their covering positions over the foam cores 34 by lines of stitching 46 at the transverse extremities of each of the foam cores between the primary base and covering layers as shown.

The final assembly of the basic foam cores into the sandwich assembly is virtually the same as previously described, that is, the primary base and covering layers 42 and 44 and the stitching 46 are covered and impregnated with the curable wet resin, secondary covering layers 48 of resin covered and impregnated fabric are applied to the primary base layers, the basic core structures interengagingly assembled and the entire assembly cured to rigidify the resin. The same wide choice of materials may be used in this assembly as in all other assemblies and structures herein described, and the same wide choice of forming is presented within the limits of the various materials used.

Figure 4:
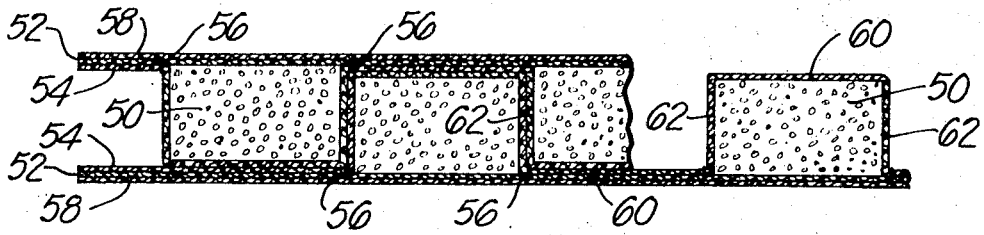
Figure 5:
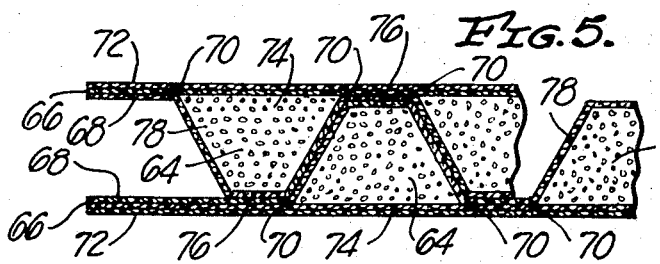

Two still different final sandwich assemblies are shown in FIGS. 4 and 5, formed in generally the same manner and from the same materials as those of FIGS. 1 through 3, but involving a slightly different concept of foam core positioning and sandwich interengagement to provide certain specific final qualities. The difference in basic concept of the final sandwich assemblies of FIGS. 4 and 5 is that not only are the foam cores thereof in the individual basic core structure formed with four or an additional flat side, the individual foam cores of each of the basic core structures are transversely spaced uniformly apart. Thus, where the final sandwich assemblies are desired to be in the flat panel form, as shown, in the final, resin cured, rigidified state, increased overall fabric surface contact is obtained between the basic core structures for increased cured resin bonding so as to increase at least shearing strength within the final assembly parallel to the final flat surfaces thereof.

Generally, as before, the sandwich assembly of FIG. 4 has the individual basic core structures each formed with foam cores 50, a flexible fabric primary base layer 52, a flexible fabric primary covering layer 54 and lines of stitching 56, the basic core structures ultimately receiving the flexible fabric secondary covering layers 58 at the time of assembly. The foam cores 50 are, however, rectangular in transverse cross section and spaced transversely apart so that the lines of stitching 56 at the transverse extremities of the foam cores result in two lines of stitching between each set of foam cores spaced transversely apart and the primary base and covering layers 52 and 54 extending abutting transversely between the foam cores, one to the next. In the final sandwich assembly, therefore, the parts of the primary covering layers 54 at upper flat sides 60 give increased surface abutment between the basic core structures for increased shear strength parallel to the flat sides of the final sandwich assembly, and slightly less surface contact at upright, transversely opposed sides 62 of the foam cores.

The basic core structures of the sandwich assembly of FIG. 5 also include foam cores 64, flexible fabric primary base layers 66, flexible fabric primary covering layers 68 and lines of stitching 70, with the later added flexible fabric secondary covering layers 72. Furthermore, the foam cores 64 are in the transversely spaced positions with the double stitching, but the foam cores are of isosceles trapezoidal transverse cross sections with major base sides 74 at the primary base layer 66 and minor or shortened base sides 76 spaced away from the primary base layer. Thus, in the final sandwich assembly of FIG. 5, there is reduced surface abutment between the parts of the primary covering layers 68 of the basic core structures at the foam core shortened base sides 76 slightly reducing the shear strength thereof parallel to the sandwich assembly flat sides, while increased surface contact or abutment between the foam cores at foam core transversely opposed sides 78, again illustrating the wide versatility and wide choice of strength features that may be incorporated into the cellular foam core structures and assemblies of the present invention.

Figure 6:
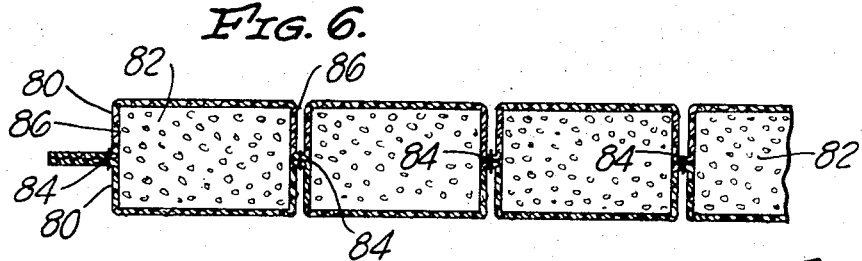
FIGS. 6, 7 and 8 are views similar to FIG. 2, but illustrating various forms of basic foam core structures adapted for separate use and prior to any cured resin rigidifying or integration into any subassemblies or final overall assemblies.
Figure 7:
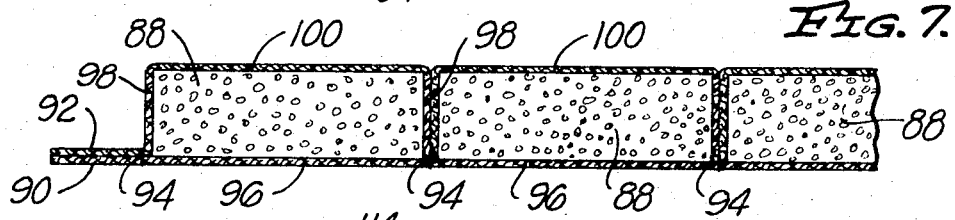
Figure 8:
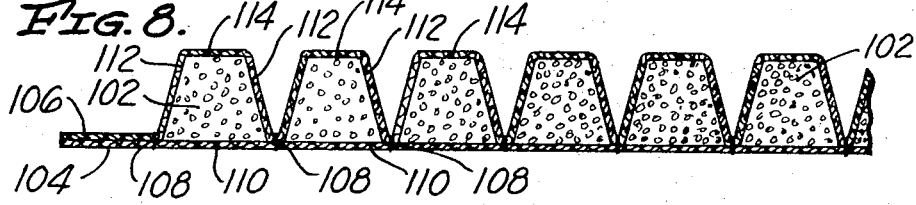

In FIGS. 6, 7 and 8 are shown examples of different basic core structures according to the present invention which are normally used singularly, as opposed to the foregoing sandwich construction. Each of these basic core structures has particular versatility and those of FIGS. 7 and i providing the most advantages for reasons to be herein pointed out.

The basic core structure of FIG. 6 is of quite limited use and it is basically different from the other structures herein involved in that it includes two primary covering layers 80 of flexible fabric continuously covering foam cores 82 of rectangular cross section and stitched by lines of stitching 84 midway of foam core transversely facing sides 86. The foam cores 82 may be transversely positioned spaced slightly apart to provide increased flexing formability or may have the parts of the primary covering layers 80 at the transversely facing sides 86 thereof closely abutting for less flexing and more solid resin rigidified final form. It is apparent, however, that far less flexibility in formation is provided with this construction, due to the midway covering layer stitching.

The more versatile basic core structure of FIG. 7 includes transversely adjacent, rectangular transverse cross section foam cores 88, a flexible fabric primary base layer 90, a flexible fabric primary covering layer 92 and lines of stitching 94 between the primary base and covering layers along the transverse extremities of the foam cores. The primary base layer 90 extends continuously along lower base sides 96 of the foam cores 88 without projecting upwardly transversely therebetween, while the primary covering layer 92 extends continuously upwardly over upright, transversely opposed sides 98 and upper extremity sides 100 of the foam cores from and to the primary base layer and the lines of stitching 94 between said layers. Obviously, the basic core structure of FIG. 7 provides extreme flexibility in the transverse direction before curing, since the foam cores 88 may be spread angularly apart in any degree desired prior to integration into a final overall assembly combined with other fabric layers and face surfaces or layers of various types, certain of which will be hereinafter illustrated and described. The final resin rigidifying of the basic core structure is accomplished in the same manner as previously described.

The basic core structure of FIG. 8 is even more versatile for curved formation prior to resin rigidifying than that of FIG. 7 and includes foam cores 102, a flexible fabric primary base layer 104, a flexible fabric primary covering layer 106 and lines of stitching 108. The foam cores 102 are isosceles trapezoidal in transverse cross section positioned with major base sides 110 transversely adjacent and continuously covered by the primary base layer 104 and the primary covering layer 106 extending continuously from and to the primary base layer along transversely opposed or facing sides 112 upwardly over upper extremity minor base sides 114. Thus, in flexible form prior to resin rigidifying and in view of the primary base layer 104 not extending upwardly transversely between the foam cores 102, the basic core structure of FIG. 8 may be transversely flexed by flexing of the fabric layers between the foam cores in the one direction until the parts of the primary covering layer 106 over the foam core transversely facing sides 112 abut, and in the other direction almost unlimited.

Figure 9:
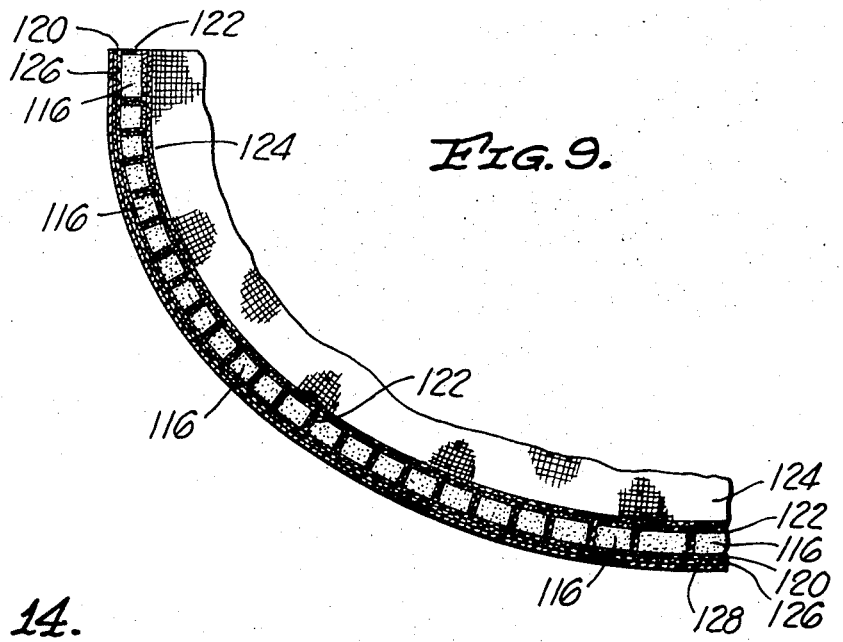
FIG. 9 is a fragmentary, vertical sectional view of a final overall assembly incorporating a basic foam core structure or structures having appropriately mixed transverse cross sectionally configured foam cores therein adapting the same for a particular final curvature.

Still a further important versatility feature of the cellular foam core structures and assemblies formed by the methods of the present invention is that for custome overall assemblies, and even in certain cases of somewhat modular use, foam cores of different transverse cross sections may be intermixed in a single basic core structure or in an assembly of a series of basic core structures. For instance, in FIG. 9 is illustrated a final overall assembly making use of foam cores 116 of mixed rectangular and isosceles trapezoidal transverse cross sections in order to lay up a boat hull having compound curving while still providing a solid foam and resin rigidified fabric hull construction. The basic core structures used are in the singular form such as those of FIGS. 7 and 8 wherein the foam cores 116 are transversely adjacent and the section of FIG. 9 is transversely through the basic core structure and the foam cores thereof.

The procedural or method steps for forming the boat hull of FIG. 9 are shown in FIGS. 10 through 13, and as would be the usual practice, the lay up is accomplished in a usual form of mold 118. The materials used in this case are preferably preformed foam cores 116 of closed cell polyurethane foam, a flexible fabric primary base layer of fiberglass 120, a flexible fabric primary covering layer of fiberglass 122, a flexible fabric secondary covering layer of fiberglass 124 covering the primary base layer 120, a flexible fabric secondary covering layer of fiberglass 126 covering the parts of the primary covering layer 122 at the foam core upper extremities, and a thickened outer facing or layer 128 of colored resin. The resin used for rigidifying after curing of the various fabric layers and that of the thickened outer facing 128 may be the same and may be of any of the usual forms catalyzed for curing either at room temperature or elevated temperatures, the latter being preferred.

Referring to FIG. 10. the thickened outer facing 128 of wet resin is applied to the molding surface 130 of the mold 118, and although not shown for simplification purposes in FIGS. 10 and 13, it will be noted in FIG. 9 that the molding surface curves rather sharply transversely of the basic core structure, thereby illustrating compound curving. Next, the flexible fabric secondary covering layer 126 is applied to the inner surface of the thickened outer facing 128 as shown in FIG. 11 and is wet resin covered and impregnated, this subassembly then being resin cured to rigidify the same. This subassembly is then ready for integration with the basic core structure.

The basic core structure is preassembled in flexible form in the manner described relative to those of FIGS. 7 and 8, except that the foam cores 116 are of predetermined mixed transverse rectangular and isosceles triangular cross section. As is evident, the isosceles triangular cross section cores permit the relatively sharp transverse curving while still resulting in a solid core assembly and the rectangular cross section cores are located at the flat or substantially flat portions of the hull.

The primary base and covering layers of the basic core structure, including the previously described lines of stitching thereof (not shown), are wet covered and impregnated with resin, as shown in FIG. 12, laid up against the previously resin cured subassembly of the secondary covering layer 126 and the thickened outer facing 128. During such laying up, the primary base layer 120 of the basic core structure is retained at the outer side directly against the rigidified secondary covering layer 126 with the upper extremities of the foam cores 116 and the parts of the primary covering layer 122 thereover projecting inwardly and, at this stage, still exposed. The still wet and flexible basic core structure will, therefore, be formed curved transversely to bring the foam core transverse sides and the parts of the primary covering layer 122 thereover into transverse abutment as precalculated by the preforming of the foam core transverse cross sections, while at the same time, the foam cores 116 and their fabric layers will be gently flexed curved longitudinally of the basic core structure within the limits of the foam core closed cell constructions.

Finally, as shown in FIG. 13, the flexible fabric secondary covering layer 124 is applied covering the upper extremities of the foam cores 116 and the parts of the primary covering layer 122 thereover, and as positioned, this secondary covering layer 124 extends merely continuously along the basic core structure as formed and does not project transversely between the adjacent foam cores 116. The secondary covering layer 124 is covered and impregnated with wet resin and the entire second subassembly is resin cured to rigidify the same and resin bond internally, as well as to the secondary covering layer 126 and the thickened outer facing layer 128 which have been previously cured. The resulting assembly may than be removed from the mold 118 and will appear as shown in FIG. 9.

In the foregoing boat hull assembly and in any other assembly where it might be advantageous, usual procedures of vacuum forming may be used as desired. Furthermore, vacuum or pressure may be used to force wet resin into internal portions of the fabric layers and the lines of stitching thereof where advantageous and by usual well known procedures.

Figure 14:
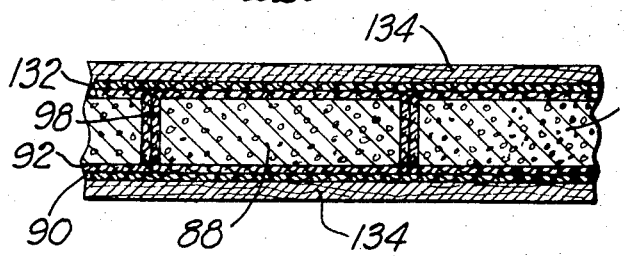
FIG. 14 is a fragmentary, vertical sectional view of a final overall assembly incorporating the basic foam core structure of FIG. 7.

Another example of use of a basic core structure formed by the methods of the present invention for forming an overall final assembly is illustrated in FIG. 14, wherein the basic core structure of FIG. 7 and previously described is integrated into a panel assembly with a secondary covering layer 132 and rigid outer facing layers 134. The basic core structure is formed as before, the primary base and covering layers 104 and 106, as well as the lines of stitching 108, are covered and impregnated with wet resin, the secondary covering layer 132 applied covered and impregnated by the wet resin, the rigid outer facing layers 134, preferably of wood or composition, are applied and the entire assembly cured for rigidifying the resin. The resulting overall assembly will be solid and strong, particularly due to the resin rigidifying of all fabric layers and the resin bonding of all abutting fabric layer parts, while the resin will equally bond the fabric layers to the outer facing layers 134.

Thus, according to the principles of the present invention, methods of fabricating cellular foam core structures and assemblies are provided with the resulting structures all involving a new concept of composite foam and resin rigidified fabric, such construction being virtually the reverse of the concepts used in the prior constructions. Furthermore, the cellular foam core structures and assemblies resulting from the methods of fabrication herein involved are extremely versatile, both as to the wide variety of final overall assemblies into which they may be integrated and the degrees of forming which may be incorporated therein. Despite this extreme versatility, the cellular foam core structures and assemblies resulting from the methods of fabrication of the present invention are quite simple and basic in fabrication method and may be formed from a wide choice of materials.

I claim:

1. In a method of forming a cellular foam core structure assembly, the steps of: preforming a series of longitudinally extending foam cores of a closed cell plastic foam material having defined transverse cross sections and with all surfaces in transverse cross section being substantially flat, each core in said transverse cross section having a lower base side and generally oppositely transversely facing sides; with said foam cores in positions side by side generally transversely adjacent extending generally parallel in said longitudinal extension and generally transversely side by side aligned, covering all of said foam core lower base sides with a primary base layer of relatively flexible fabric extending only progressively substantially continuously transversely and longitudinally along said foam core lower base sides while maintaining said primary base layer substantially free of any upward projection between said side by side transversely adjacent foam cores; with said foam cores in said side by side transversely adjacent positions extending generally parallel in said longitudinal extension and generally transversely side by side aligned, covering all of said foam cores with a primary covering layer of relatively flexible fabric extending only progressively from said primary base layer substantially continuously upwardly over and downwardly transversely between said transversely adjacent foam cores to said primary base layer; with said foam cores in said transversely adjacent positions extending generally parallel in said longitudinal extension and generally transversely side by side aligned covered with said primary base and covering layers, stitching between said primary base and covering layers at transverse extremities of each of said foam cores only at said primary base layer; during said stitching, maintaining said stitching free of any appreciable penetration of said foam cores; after said covering with said primary base and covering layers and said stitching, covering and impregnating said primary base and covering layers and said stitching throughout with a wet resin; and curing said resin to rigidify and resin bond said primary base and covering layers and said stitching.

2. A method of forming a cellular foam core structure assembly as defined in claim 1 in which said method includes the step of prior to said curing of said resin but after said covering of said foam cores with said primary base and covering layers and after said stitching, shaping the assembly of said foam cores and fabric layers to a predetermined shape as permitted by said primary base and covering layer flexibility and curing said resin while maintaining said assembly in said predetermined shape.

3. A method of forming a cellular foam core structure assembly as defined in claim 1 in which said method includes the steps of prior to said resin curing but after said covering of said foam cores with said primary base and covering layers and after said stitching, applying resin coated and impregnated secondary covering layers substantially continuously covering said primary base layer at said primary base layer and substantially continuously covering said primary covering layer at least at upper extremities of said foam cores, and curing said resin of each of said secondary covering layers one of before and during said curing of said resin of said primary base and covering layers and said stitching to rigidity and resin bond said secondary covering layers to said primary base and covering layers.

4. A method of forming a cellular foam core structure assembly as defined in claim 1 in which said method includes the step of prior to said curing of said resin but after said covering of said foam cores with said primary base and covering layers and after said stitching, shaping the assembly of said foam cores and said primary fabric layers into a predetermined shape as permitted by said primary base and covering layer flexibility and carrying out said curing while maintaining said assembly in said predetermined shape; and in which said method includes the steps of also prior to said curing of said resin of said primary base and covering layer and stitching assembly, sandwiching said assembly in said predetermined shape between substantially continuously extending secondary covering layers of resin coated and impregnated fabric, and one of before and during said assembly resin curing, curing said resin of said secondary covering layers to rigidify and resin bond said secondary covering layers with said assembly in said predetermined shape.

5. A method of forming a cellular foam core structure assembly as defined in claim 1 in which said method includes the step of prior to said resin curing but after the assembly of said foam cores and said fabric layers and said stitching, shaping said assembly as permitted by said fabric layer flexibility to bring transversely facing of said foam core sides into substantial abutment by virtue of shaping said assembly to cause transverse abutment between parts of said primary covering layer over said foam core sides; and in which said method includes the steps of also prior to said resin curing of said shaped assembly, sandwiching said shaped assembly between substantially continuously extending secondary covering layers of resin coated and impregnated fabric, and curing said resin of each of said secondary covering layers one of before and during said curing of said resin of said shaped assembly to rigidify and resin bond said secondary covering layers with said shaped assembly fabric layers.

6. A method of forming a cellular foam core structure assembly as defined in claim 1 in which said method includes the steps of prior to said resin curing but after the assembly of said foam cores and said fabric layers and said stitching, applying said assembly to a rigid preformed face layer and conforming said assembly to the shape of said face layer, and then curing said resin of said assembly to resin bond said assembly to said face layer.

7. In a method of forming a cellular foam core structure assembly, the steps of: preforming a series of longitudinally extending foam cores of a closed cell plastic foam material having defined transverse cross sections and with all surfaces in transverse cross section being substantially flat, each core in said transverse cross section having a lower base side and generally oppositely transversely facing sides; with said foam cores in positions side by side generally transversely adjacent extending generally parallel in said longitudinal extension and generally transversely side by side aligned, covering all of said foam core lower base sides with a primary base layer of relatively flexible fabric extending only progressively substantially continuously transversely and longitudinally along said foam core lower base sides while maintaining said primary base layer substantially free of any upward projection between said side by side transversely adjacent foam cores; with said foam cores in said side by side transversely adjacent positions extending generally parallel in said longitudinal extension and generally transversely side by side aligned, covering all of said foam cores with a primary covering layer of relatively flexible fabric extending only progressively from said primary base layer substantially continuously upwardly over and downwardly transversely between said transversely adjacent foam cores to said primary base layer; with said foam cores in said transversely adjacent positions extending generally parallel in said longitudinal extension and generally transversely side by side aligned covered with said primary base and covering layers, stitching between said primary base and covering layers at transverse extremities of each of said foam cores only at said primary base layer; during said stitching, maintaining said stitching free of any appreciable penetration of said foam cores; wet forming and shaping a thickened face coat including a wet resin and having a predetermined shape; applying a secondary covering layer of relatively flexible fabric to said wet resin face coat extending substantially continuously over said wet resin face coat and shaped to said face coat shape; wet resin covering and impregnating said secondary covering layer throughout said secondary covering layer; curing said resin of said face coat and said secondary covering layer to rigidify and resin bond said face coat and said secondary covering layer both in said face coat predetermined shape; after said covering of said foam cores with said primary base and covering layers and said stitching, covering and impregnating the assembly of said primary base and covering layers and said stitching throughout with a wet resin; applying and shape conforming said wet resin covered and impregnated assembly of said foam cores and said primary base and covering layers and said stitching to said cured resin rigidified face coat and secondary covering layer; applying and shaping a secondary covering layer of relatively flexible fabric to and extending substantially continuously over said foam core and primary layer and stitching assembly at an exposed side of said assembly opposite said resin cured rigidified face coat and secondary covering layer; covering and impregnating the last applied and shaped of said secondary covering layers with a wet resin; and curing all of the remaining of said wet resin to rigidify and resin bond the remainder of the overall assembly to said previously cured resin rigidified face coat and secondary covering layer.

8. A method of forming a cellular foam core structure assembly as defined in claim 7 in which said wet forming and shaping of said thickened face coat includes the wet forming and shaping of said thickened face coat at least partially curved in a direction at least transversely of said foam cores in said overall assembly.

9. A method of forming a cellular foam core structure assembly as defined in claim 7 in which said wet forming and shaping of said thickened face coat includes the wet forming and shaping of said thickened face coat at least partially curved both transversely and longitudinally of said foam cores in said overall assembly.

10. A method of forming a cellular foam core structure assembly as defined in claim 7 in which said wet forming and shaping of said thickened face coat includes the wet forming and shaping of said thickened face coat into a shape that said foam cores in said conformed and shaped overall assembly have transversely facing sides one to the next substantially transversely abutting by virtue of transverse abutment and resin bonding between parts of said primary covering layer over said foam core transversely facing sides, and wet forming and shaping said thickened face coat at least partially curved both transversely and longitudinally of said foam cores in said overall assembly.

* * * * *